US012661679B2

(12) United States Patent
Seto et al.

(10) Patent No.: US 12,661,679 B2
(45) Date of Patent: Jun. 23, 2026

(54) LIQUID EJECTION DEVICE

(71) Applicant: SEIKO EPSON CORPORATION, Tokyo (JP)

(72) Inventors: Takeshi Seto, Shiojiri (JP); Hirokazu Sekino, Chino (JP); Yasunori Onishi, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 238 days.

(21) Appl. No.: 18/179,616

(22) Filed: Mar. 7, 2023

(65) Prior Publication Data

US 2023/0286007 A1 Sep. 14, 2023

(30) Foreign Application Priority Data

Mar. 8, 2022 (JP) ................................ 2022-035344

(51) Int. Cl.
*B05B 17/00* (2006.01)

(52) U.S. Cl.
CPC ................................ *B05B 17/0646* (2013.01)

(58) Field of Classification Search
CPC . B05B 17/0646; B05B 17/06; B05B 17/0638; B05B 17/0653; B05B 17/0607; B05B 12/082; B05B 12/085; A61B 2017/00402; A61B 17/3203
See application file for complete search history.

(56) References Cited

U.S. PATENT DOCUMENTS

| | | | | |
|---|---|---|---|---|
| 5,020,724 | A | 6/1991 | Kiyono et al. | |
| 9,358,569 | B2 * | 6/2016 | Burt | B05B 17/0615 |
| 9,662,135 | B2 * | 5/2017 | Kojima | A61B 17/3203 |
| 2009/0017423 | A1 | 1/2009 | Gottenbos et al. | |
| 2013/0026250 | A1 * | 1/2013 | Burt | B05B 17/0615 239/302 |
| 2013/0079732 | A1 | 3/2013 | Burt et al. | |
| 2021/0031520 | A1 | 2/2021 | Sekino et al. | |

FOREIGN PATENT DOCUMENTS

| | | | |
|---|---|---|---|
| CN | 112297630 | A | 2/2021 |
| JP | H02145296 | U | 12/1990 |
| JP | H08257997 | A | 10/1996 |
| JP | 2007518487 | A | 7/2007 |
| JP | 2021023996 | A | 2/2021 |

OTHER PUBLICATIONS

Office Action for CN Patent Application No. 202310217624.8, issued on Mar. 1, 2026, 12 pages.

* cited by examiner

*Primary Examiner* — Christopher R Dandridge
(74) *Attorney, Agent, or Firm* — CHIP LAW GROUP

(57) ABSTRACT

A liquid ejection device includes: a nozzle through which a liquid is ejected; a liquid transport pipe that transports the liquid to the nozzle; and a vibrator that is configured to generate a vibration. The vibrator is in contact with at least one of the liquid, the nozzle, and the liquid transport pipe, and a vibration frequency generated by the vibrator is higher than a self-droplet formation frequency, the self-droplet formation frequency is defined as the number of droplets of the liquid passing through a predetermined position per unit time in a state in which the vibrator does not generate the vibration.

12 Claims, 9 Drawing Sheets

LIQUID EJECTION DEVICE

The present application is based on, and claims priority from JP Application Serial Number 2022-035344, filed Mar. 8, 2022, the disclosure of which is hereby incorporated by reference herein in its entirety.

BACKGROUND

1. Technical Field

The present disclosure relates to a liquid ejection device.

2. Related Art

In the related art, various liquid ejection devices for ejecting a liquid onto an object have been used. Among such liquid ejection devices, there is a liquid ejection device that causes droplets ejected in a continuous state to collide with an object in a state in which a liquid is formed into droplets. For example, JP-A-H8-257997 discloses that a liquid pressurized to a high pressure is mixed with a gas, and the liquid is ejected from a nozzle, thereby causing the mixture in a state of being formed into droplets to collide with an object.

However, in the liquid ejection device of the related art having the configuration in which a liquid formed into droplets as described in JP-A-H8-257997 collides with an object, when the liquid is ejected at a high speed, a droplet formation distance is long. When the droplet formation distance is long, a distance from an ejecting portion to the object must be long, and therefore, workability is deteriorated, such as a need to secure a large working space.

SUMMARY

According to an aspect of the present disclosure for solving the above problem, there is provided a liquid ejection device including: a nozzle through which a liquid is ejected; a liquid transport pipe that transports the liquid to the nozzle; and a vibrator that is configured to generate a vibration. The vibrator is in contact with at least one of the liquid, the nozzle, and the liquid transport pipe, and when the number of droplets that fly as a plurality of droplets of the liquid ejected from the nozzle in a state in which the vibrator does not generate the vibration and pass through a predetermined position per unit time is set as a self-droplet formation frequency, a vibration frequency generated by the vibrator is higher than the self-droplet formation frequency.

DESCRIPTION OF EXEMPLARY EMBODIMENTS

Figure 1:
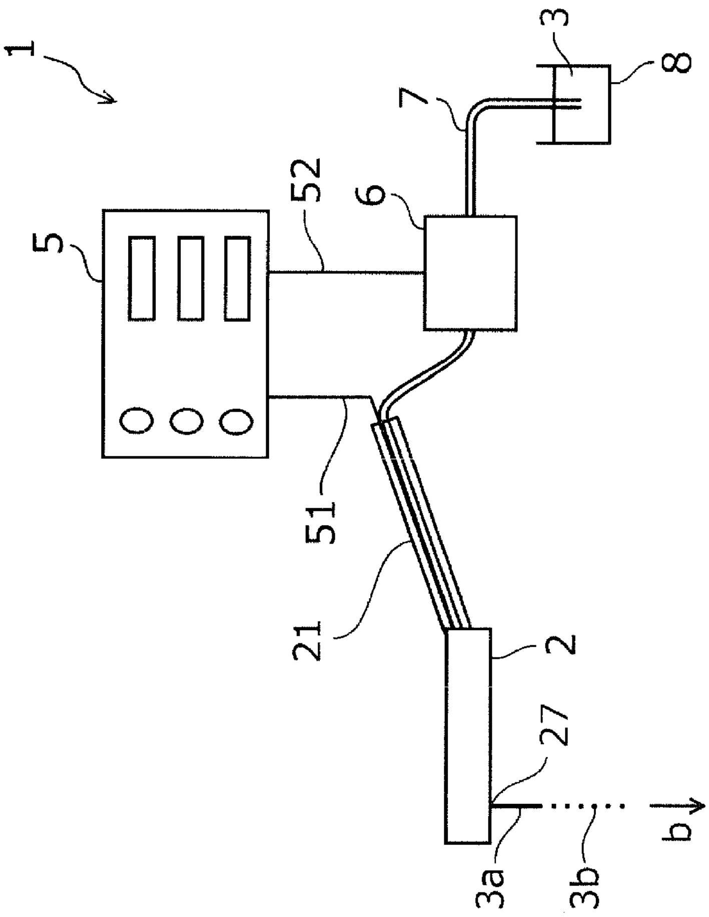
FIG. 1 is a schematic view showing a liquid ejection device according to a first embodiment.

First, the present disclosure will be schematically described.

According to a first aspect of the present disclosure, there is provided a liquid ejection device including: a nozzle through which a liquid is ejected; a liquid transport pipe that transports the liquid to the nozzle; and a vibrator that is configured to generate a vibration. The vibrator is in contact with at least one of the liquid, the nozzle, and the liquid transport pipe, and when the number of droplets that fly as a plurality of droplets of the liquid ejected from the nozzle in a state in which the vibrator does not generate the vibration and pass through a predetermined position per unit time is set as a self-droplet formation frequency, a vibration frequency generated by the vibrator is higher than the self-droplet formation frequency.

According to the aspect, the vibration frequency generated by the vibrator is higher than the self-droplet formation frequency. As a result of intensive studies by the present inventors, it is found that the droplet formation distance can be shortened by setting the vibration frequency generated by the vibrator to be higher than the self-droplet formation frequency. Therefore, the self-droplet formation distance can be shortened even when the liquid is ejected at a high speed.

According to a second aspect of the present disclosure, in the liquid ejection device according to the first aspect, the vibration frequency generated by the vibrator is 1.5 times or less the self-droplet formation frequency.

According to the aspect, the vibration frequency generated by the vibrator is 1.5 times or less the self-droplet formation frequency. When the vibration frequency generated by the vibrator is too high, the droplets may not be appropriately formed, but by setting the vibration frequency generated by the vibrator to 1.5 times or less of the self-droplet formation frequency, it is possible to prevent the droplet formation from not being appropriately performed.

According to a third aspect of the present disclosure, in the liquid ejection device according to the first or second aspect, the vibration frequency generated by the vibrator is 90 kHz or more.

According to the aspect, the vibration frequency generated by the vibrator is 90 kHz or more. By setting the vibration frequency generated by the vibrator to 90 kHz or more, the droplet formation distance can be particularly suitably shortened.

According to a fourth aspect of the present disclosure, in the liquid ejection device according to any one of the first to third aspects, the vibrator generates a vibration that causes the liquid to pulsate in a transport direction of the liquid.

According to the aspect, the vibrator generates a vibration that causes the liquid to pulsate in a transport direction of the liquid. By causing the liquid to pulsate in the transport direction of the liquid, the droplet formation distance can be particularly suitably shortened.

According to a fifth aspect of the present disclosure, in the liquid ejection device according to the fourth aspect, the vibrator causes the liquid transport pipe to vibrate in the transport direction of the liquid.

According to the aspect, the vibrator causes the liquid transport pipe to vibrate in the transport direction of the liquid. By causing the liquid transport pipe to vibrate in the transport direction of the liquid, the liquid can be suitably caused to pulsate in the transport direction of the liquid.

According to a sixth aspect of the present disclosure, in the liquid ejection device according to the fourth aspect, the vibrator causes the liquid transport pipe to vibrate in a direction orthogonal to the transport direction of the liquid.

According to the aspect, the vibrator causes the liquid transport pipe to vibrate in the transport direction of the liquid. Therefore, it is possible to easily form a configuration in which the liquid transport pipe is caused to vibrate in the transport direction of the liquid.

According to a seventh aspect of the present disclosure, in the liquid ejection device according to any one of the first to sixth aspects, the vibrator includes a piezoelectric element.

According to the aspect, the vibrator includes a piezoelectric element. Therefore, a vibrator capable of generating a high vibration frequency can be implemented by the piezoelectric element.

According to an eighth aspect of the present disclosure, in the liquid ejection device according to any one of the first to sixth aspects, the vibrator includes an electrostatic actuator.

According to the aspect, the vibrator includes an electrostatic actuator. Therefore, a high vibration frequency can be generated by the electrostatic actuator.

Hereinafter, an embodiment of the present disclosure will be described with reference to accompanying drawings. First, an outline of a liquid ejection device 1 according to an embodiment of the present disclosure will be described with reference to FIG. 1. The liquid ejection device 1 shown in FIG. 1 includes a head portion 2, a tank 8 that stores a liquid 3 to be ejected, a liquid transport pipe 7 including a tube coupling the head portion 2 and the tank 8 and a flow path of the liquid 3 in the head portion 2, a liquid feed pump 6, and a control device 5 including a drive signal line 51 to the head portion 2 and a control signal line 52 to the liquid feed pump 6.

A user uses the liquid ejection device 1 having such a configuration to perform various operations by gripping a grip portion 21, causing the liquid 3 to be ejected from the head portion 2, and causing the liquid 3 to collide with a desired object. The various operations include, for example, dental treatment, but other than the dental treatment, cleaning, deburring, peeling, trimming, excising, incising, crushing, and the like of the object can be mentioned. The liquid ejection device 1 according to the embodiment is a liquid ejection device that causes a droplet 3*b* to collide with an object in a state in which the liquid 3*a* ejected in a continuous state in a direction b from a nozzle 27 provided in the head portion 2 is formed into the droplet 3*b*.

Figure 2:
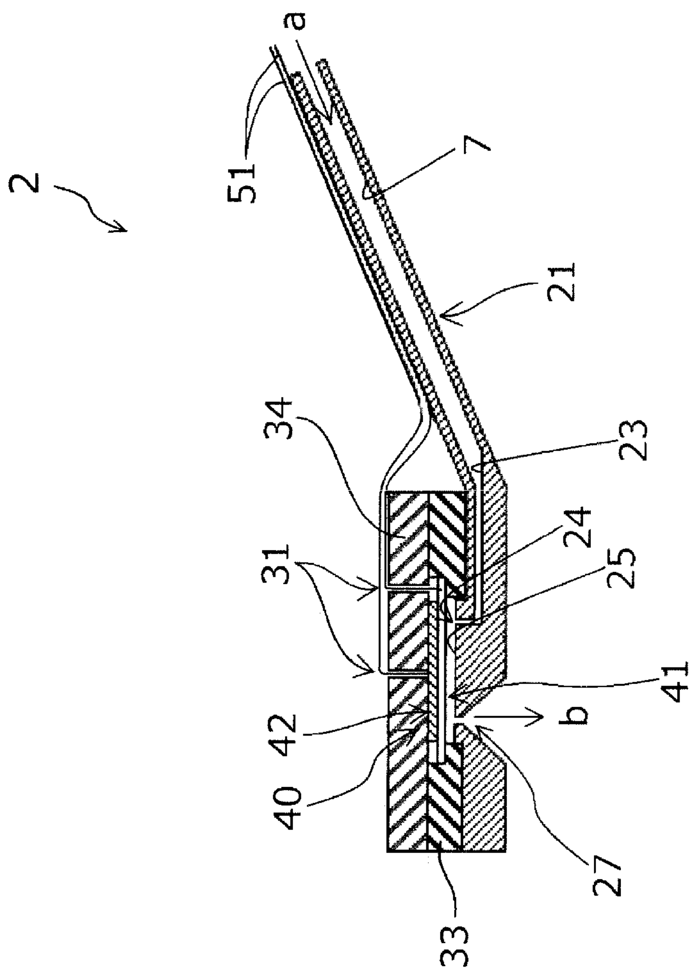
FIG. 2 is a cross-sectional view showing an ejecting portion of the liquid ejection device according to the first embodiment.

Next, the head portion 2, which is a main part of the liquid ejection device 1, will be described in detail with reference to FIG. 2. As shown in FIG. 2, the head portion 2 has an introduction flow path 23 and an inflow flow path opening portion 24 constituting the liquid transport pipe 7 in the grip portion 21. The liquid 3 flowing from the tank 8 to the head portion 2 in a direction a passes through the introduction flow path 23 and the inflow flow path opening portion 24, is guided to a fluid chamber 25, and is ejected from the nozzle 27 in the direction b as the liquid 3*a* in a high-speed continuous flow state as shown in FIG. 1.

The fluid chamber 25 is sealed by an intermediate member 33 and a diaphragm 41 fixed to the intermediate member 33 and made of a metal thin film. A single plate piezoelectric element 42 made of PZT having electrodes formed on both surfaces thereof and having a diameter of 17.7 mm and a thickness of 1 mm is fixed to a surface of the diaphragm 41 opposite from the fluid chamber 25 by a conductive adhesive for establishing electrical coupling with the diaphragm 41. The drive signal line 51 is composed of two lines, and one of the two drive signal lines 51 is fixed to the diaphragm 41 in a conductive state through one hole portion 31 provided in a regulating portion 34, and the other one is fixed to the electrode of the PZT single plate piezoelectric element 42 in a direct conductive state through the other hole portion 31 provided in the regulating portion 34. The single plate piezoelectric element 42 according to the embodiment having the above configuration constitutes a vibrator 40 that generates vibration with respect to the liquid 3 flowing through the liquid transport pipe 7 in the head portion 2, and since the single plate piezoelectric element 42 is robust and inexpensive and can be miniaturized, the single plate piezoelectric element 42 is suitable for obtaining displacement in a thickness direction at a high frequency.

As described above, the vibrator 40 preferably includes a piezoelectric element such as the single plate piezoelectric element 42. This is because a vibrator capable of generating a high vibration frequency can be implemented by such a piezoelectric element. Among these, particularly preferable piezoelectric elements include, for example, piezoelectric elements made of ceramics such as $BaTiO_3$ and $PbTiO_3$ in addition to the piezoelectric element made of PZT as in the embodiment.

On the other hand, the vibrator 40 may include an electrostatic actuator in which a derivative is sandwiched between electrodes. This is because, even when the vibrator 40 includes the electrostatic actuator, a high vibration frequency can be generated by the electrostatic actuator. In particular, by forming the derivative from a soft material such as a resin, a degree of freedom in design can be increased.

Next, specific operations of the liquid ejection device 1 according to the embodiment will be described. For example, first, a pump drive signal is sent to the liquid feed pump 6 via the control signal line 52 from the control device 5 shown in FIG. 1. As a result, the liquid feed pump 6 suctions the liquid 3 from the tank 8 through the tube constituting the liquid transport pipe 7, and feeds the liquid 3 to the head portion 2 at a high pressure through the tube. The liquid 3 flows in the direction a in FIG. 2 and flows into the fluid chamber 25 through the inflow flow path opening portion 24.

In the liquid ejection device 1 according to the embodiment, it is possible to promote forming the liquid into droplets by driving the vibrator 40 and applying vibration to the liquid 3 in the head portion 2, and forming the liquid into droplets may not be promoted by not driving the vibrator 40 and not applying the vibration to the liquid 3 in the head portion 2. In the liquid ejection device 1 according to the embodiment, when the promotion of forming the liquid into droplets is not performed, the liquid 3 discharged from the nozzle 27 is ejected as a continuous flow like the liquid 3*a* in FIG. 1, and is eventually divided by surface tension of the liquid 3 itself and flies as droplets like the liquid droplet 3*b* in FIG. 1. Hereinafter, generation of the droplet 3*b* by being divided by the surface tension of the liquid 3 itself without the promotion of forming the liquid into droplets is referred to as self-droplet formation.

An impact pressure, which is a force that the object receives from the liquid 3 when the liquid 3 collides with the object, is $\frac{1}{2}\times\rho\times V^2$ stagnation pressure, in which V is an ejecting speed of the liquid 3 and ρ is an operating fluid density, in the case of the liquid 3*a* in the continuous flow state. On the other hand, the impact pressure when the liquid 3 is formed into the droplet 3*b* is an impact pressure expressed by $\rho\times C\times V$, in which C is a sound velocity in the liquid 3. For example, since a sound velocity in water is about 1500 m/s, when the ejecting speed of the liquid 3 is 100 m/s, the force applied to the object is 30 times the force applied to the object in the state of liquid droplets with respect to the continuous flow state. That is, by forming the liquid 3 into droplets and causing the droplets to collide with the object, as compared with the case in which the liquid 3 is not formed into droplets at the same flow rate, the operation such as crushing or excising of the object can be performed particularly effectively.

Figure 3:
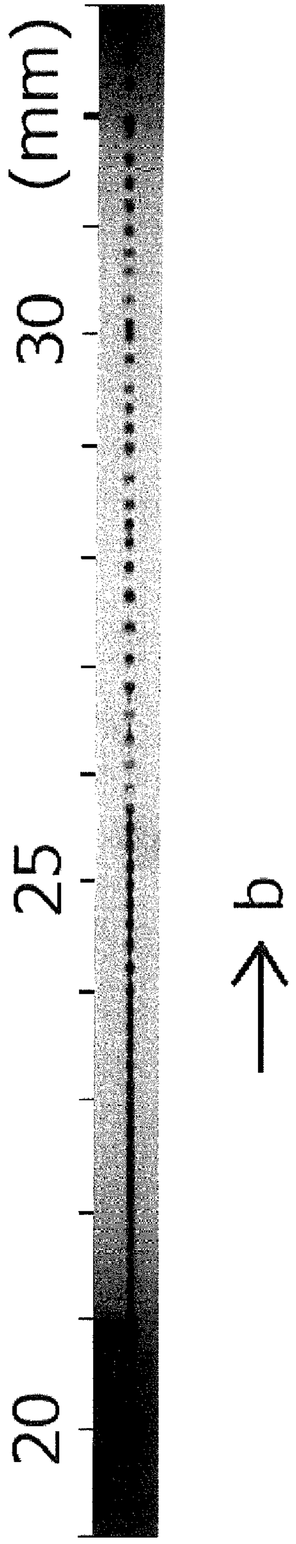
FIG. 3 is a photograph showing an ejection state of a fluid from a nozzle when a flow pulsation is not applied.

Here, FIG. 3 is a photograph showing a state of the liquid 3 in a case in which a pulsation is not applied when water of 4 ml/min is ejected from a nozzle having a nozzle diameter of 42 μm. A left end of FIG. 3 corresponds to a position 19 mm away from the nozzle 27, graduation lines in an upper portion of the photograph correspond to 1 mm intervals, and a number on an upper portion of each graduation line corresponds to a distance from the nozzle 27. As can be seen from FIG. 3, a continuous water flow is divided by the surface tension at a position 26 mm away from the nozzle 27, and the water flow is in a droplet state. In the embodiment, this 26 mm corresponds to a self-droplet formation distance.

For example, when the dental treatment is performed by causing the droplet 3*b* to collide with the object in an oral cavity, it is difficult to eject the liquid 3 to an affected part as the object from a position away from the nozzle 27 by 26 mm or more. At this time, the number of droplets 3*b* generated per second is 247,000, and a self-droplet formation frequency is referred to as 247 kHz. In other words, the number of droplets 3*b* that fly as a plurality of droplets of the liquid 3 ejected from the nozzle 27 in a state in which the vibrator 40 does not generate the vibration and pass through a predetermined position per unit time is set as the self-droplet formation frequency.

In the present disclosure, the fluid chamber 25, the diaphragm 41, and the single plate piezoelectric element 42 as a driving element, constitute the vibrator 40 as a pulsation generating unit. When an AC voltage is applied to the single plate piezoelectric element 42 by the drive signal line 51 in a state in which the liquid 3 is pressure-fed by the liquid feed pump 6 and the liquid 3 is ejected from the nozzle 27, the single plate piezoelectric element 42 vibrates in the thickness direction at a frequency of the applied voltage. The vibration of the single plate piezoelectric element 42 is transmitted to the liquid 3 in the fluid chamber 25 via the diaphragm 41, and the vibration of the liquid 3 in the fluid chamber 25 is transmitted to the liquid 3 ejected from the nozzle 27, thereby accelerating the formation of the liquid into droplets.

Figure 4:
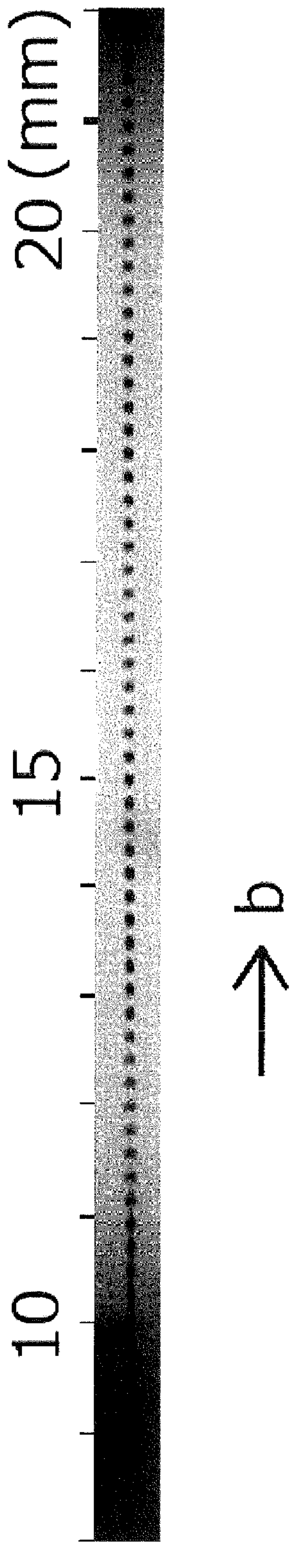
FIG. 4 is a photograph showing an ejection state of the fluid from the nozzle when the flow pulsation is applied at a vibration frequency of 252 kHz at a peak-to-peak of 10 V.

FIG. 4 shows a case in which the promotion of forming the liquid into droplets is performed by a flow pulsation at 252 kHz, which is close to the self-droplet formation frequency of 247 kHz and slightly higher than the self-droplet formation frequency. As the flow pulsation at 252 kHz is applied to the liquid 3, a voltage is applied to the single plate piezoelectric element 42, so that a peak-to-peak is 10 V with an offset of 5 V. Here, a left end of FIG. 4 corresponds to a position 8 mm away from the nozzle 27, graduation lines in an upper portion of the photograph correspond to 1 mm intervals, and a number on an upper portion of each graduation line corresponds to the distance from the nozzle 27. As is clear from comparison with the photograph of FIG. 3 showing the case in which the pulsation is not applied, the photograph of FIG. 4 shows that droplets are formed at a distance of about 13 mm from the nozzle 27, which is about half of the self-droplet formation distance, and a droplet shape and a droplet interval are uniform. That is, since the liquid droplets are formed from the vicinity of the nozzle 27, the liquid droplets can be used even in an operation in the oral cavity or in a narrow place in which a short distance treatment is required. In addition, since the droplet shape and the droplet interval are constant, the impact pressure is constant, the impact pressure is not easily affected by a water film of a previous droplet and the like, and efficient crushing and incising can be performed.

As described above, in the liquid ejection device 1 according to the embodiment, the vibrator 40 is in contact with the liquid 3. The vibration frequency generated by the vibrator 40 is higher than the self-droplet formation frequency. As can be seen from a comparison between FIG. 3 and FIG. 4, the droplet formation distance can be shortened by setting the vibration frequency generated by the vibrator 40 to be higher than the self-droplet formation frequency. Therefore, the liquid ejection device 1 according to the embodiment can shorten the droplet formation distance even when ejecting the liquid 3 at a high speed. Although the vibrator 40 according to the embodiment is in contact with the liquid 3, the vibrator 40 may be in contact with at least one of the liquid 3, the nozzle 27, and the liquid transport pipe 7.

As described above, when the flow pulsation is not applied, the self-droplet formation frequency is about 247 kHz, but the droplet formation can be promoted by the flow pulsation. In addition, since a droplet diameter of the droplet 3*b* is also changed by changing a frequency of the flow pulsation, it is possible to change the droplet diameter in accordance with conditions of the crushing, the excising, and a cleaning state of the object, or the like.

Here, in order to determine a particularly preferable frequency, sine waves having a peak-to-peak of 10 V with an offset of 5 V and a peak-to-peak of 20 V with an offset of 10 V are applied to the single plate piezoelectric element 42.

Displacement amounts of the single plate piezoelectric element 42 in static characteristics at these voltages are as small as 0.005 nm at 10 V and 0.01 nm at 20 V. When the frequency is within a range from 89 kHz at which the droplet formation starts to be promoted due to the flow pulsation to 374 kHz at which the droplet formation ceases to be promoted, 1 kHz steps are used up to 100 kHz, and 2 kHz steps are used for higher frequencies.

Figure 5:
FIG. 5 is a photograph showing a state in which the flow pulsation is applied at a vibration frequency of 130 kHz at the peak-to-peak of 10 V, and the fluid from the nozzle is formed into droplets.
Figure 6:
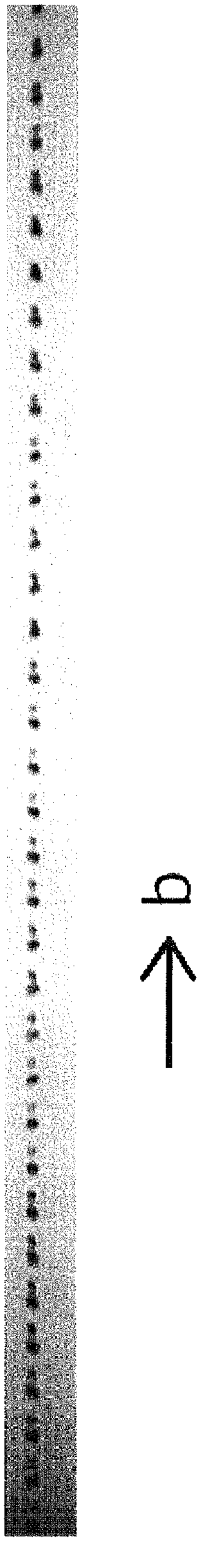
FIG. 6 is a photograph showing a state in which the flow pulsation is applied at a vibration frequency of 134 kHz at the peak-to-peak of 10 V, and the fluid from the nozzle is not formed into droplets.

A definition of the droplet formation is that the droplet 3*b* became substantially spherical after the continuous flow is divided. This is because there is a case in which satellite droplets are generated even when the droplets 3*b* are divided, and there is a frequency at which effective droplet formation cannot be performed. Therefore, FIGS. 5 and 6 show specific examples of a case in which the effective droplet formation can be performed and a case in which the effective droplet formation cannot be performed. FIG. 5 is a photograph of an example of a case in which the vibration frequency is set to 130 kHz at the peak-to-peak of 10 V as an example of a case in which the spherical droplets are effectively formed. On the other hand, FIG. 6 is a photograph of an example of a case in which the vibration frequency is set to 134 kHz at the peak-to-peak of 10 V as an example of a case in which the satellite droplets are generated and the droplets 3*b* are not preferable spherical.

Figure 7:
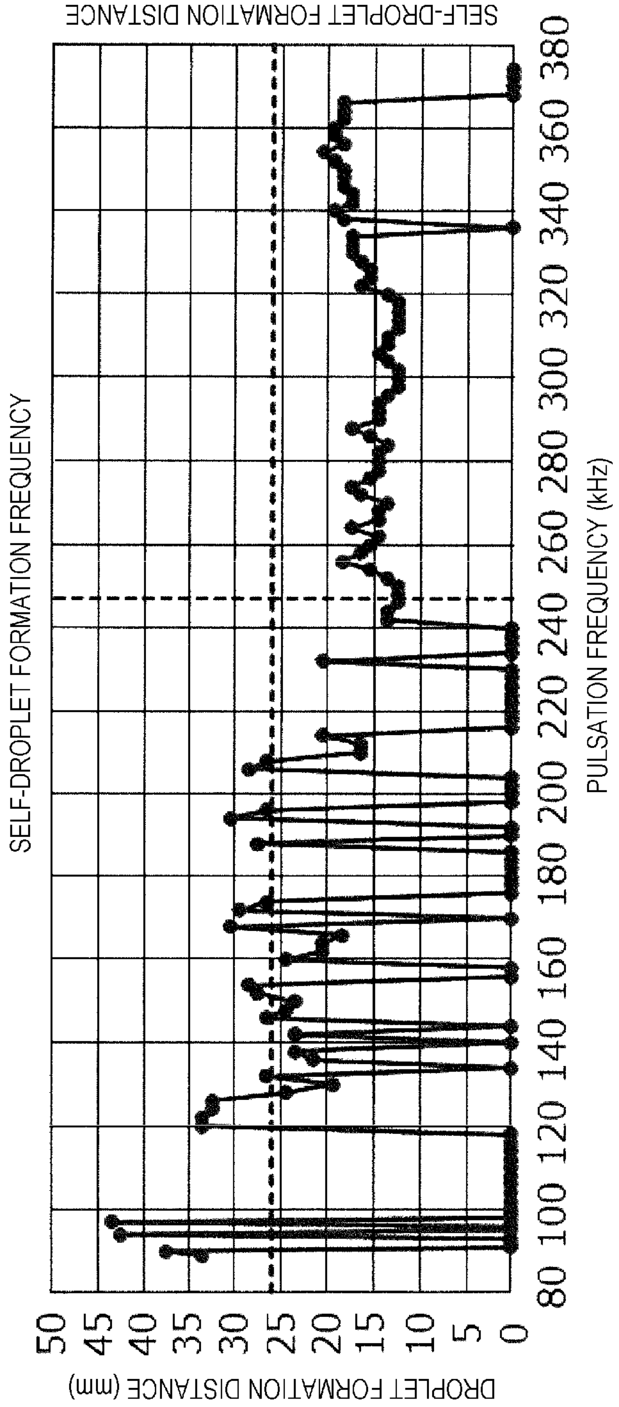
FIG. 7 is a graph showing a droplet formation distance when the vibration frequency is changed at the peak-to-peak of 10 V.
Figure 8:
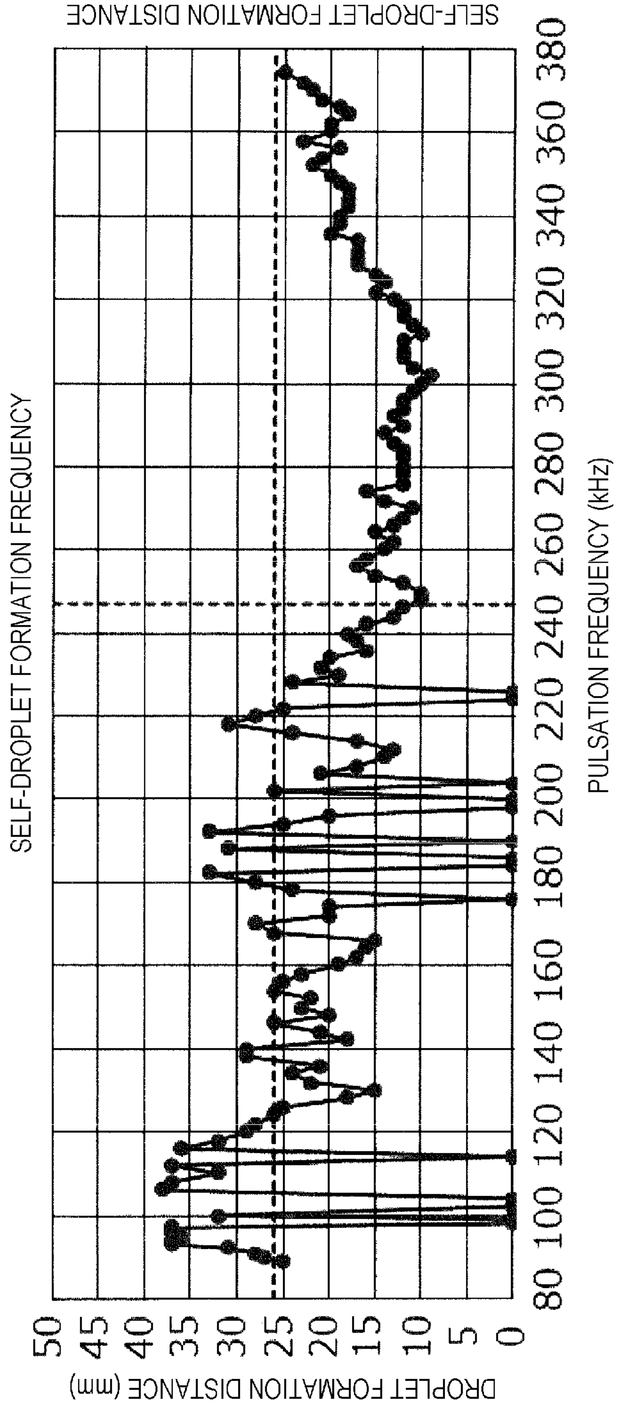
FIG. 8 is a graph showing a droplet formation distance when the vibration frequency is changed at a peak-to-peak of 20 V.

Here, FIG. 7 shows test results at a flow rate of 4 ml/min when the voltage applied to the single plate piezoelectric element 42 is the peak-to-peak of 10 V, showing the case in which effective droplet formation can be performed and the case in which the effective droplet formation cannot be performed. Here, FIG. 8 shows test results at the flow rate of 4 ml/min when the voltage applied to the single plate piezoelectric element 42 is the peak-to-peak of 20 V, showing the case in which effective droplet formation can be performed and the case in which the effective droplet formation cannot be performed. In FIGS. 7 and 8, a horizontal axis represents a pulsation frequency, which is the frequency of the sine wave applied to the single plate piezoelectric element 42, and a vertical axis represents the droplet formation distance. In FIGS. 7 and 8, the frequency displayed at the droplet formation distance of 0 mm represents a case in which the droplets 3*b* are not formed into the spherical droplets as shown in, for example, FIG. 6, and thus the droplet formation is not suitably performed.

As shown in FIG. 7, first, in the case of the peak-to-peak of 10 V in FIG. 7, stable droplet formation can be performed from 242 kHz which was slightly lower than the self-droplet formation frequency of 247 kHz, and stable droplet formation can be performed up to 334 kHz. The stable droplet formation is represented by the fact that the droplet formation distance from 242 kHz to 334 kHz is 26 mm or less and is not 0 mm. In addition, even from 338 kHz to 366 kHz, since the droplet formation distance is 26 mm or less and is not 0 mm, it can be said that the stable droplet formation can be performed. On the other hand, as shown in FIG. 8, in the peak-to-peak of 20 V of FIG. 8 in which an amplitude is increased with respect to the peak-to-peak of 10 V of FIG. 7, the stable droplet formation can be performed from 228 kHz to 374 kHz.

Here, the stable droplet formation starts at 228 kHz, which is about 0.9 times 247 kHz, which is the self-droplet formation frequency, at the peak-to-peak of 20 V in FIG. 8. Further, in the peak-to-peak of 10 V in FIG. 7, the frequency is 242 kHz, which is about one time as high as 247 kHz, which is the self-droplet formation frequency. An upper limit of the preferable frequency is 374 kHz/228 kHz, that is, about 1.6 times the self-droplet formation frequency, at the peak-to-peak of 20 V in FIG. 8. In addition, in the peak-to-peak of 10 V in FIG. 7, the upper limit of the preferable frequency is 334 kHz/242 kHz, that is, about 1.3 times the self-droplet formation frequency, in consideration of 336 kHz which is a portion in which one-point droplet formation cannot be performed, and 366 kHz/242 kHz, that is, about 1.5 times the self-droplet formation frequency, in consideration of this portion.

Based on the above results, it is preferable that the vibration frequency generated by the vibrator 40 is 1.5 times or less the self-droplet formation frequency. When the vibration frequency generated by the vibrator 40 is too high, the droplets may not be appropriately formed, but by setting the vibration frequency generated by the vibrator 40 to 1.5 times or less of the self-droplet formation frequency, it is possible to prevent the self-droplet formation from not being appropriately performed.

As a result of intensive studies made by the present inventors under various conditions, it is found that the vibration frequency generated by the vibrator 40 is preferably 90 kHz or more. By setting the vibration frequency generated by the vibrator to 90 kHz or more, the droplet formation distance can be particularly suitably shortened.

In addition, based on the result of the peak-to-peak of 20 V in FIG. 8, the vibration frequency generated by the vibrator 40 is preferably 370 kHz or less. By setting the vibration frequency generated by the vibrator to 370 kHz or less, the droplet formation distance can be particularly suitably shortened.

Figure 9:
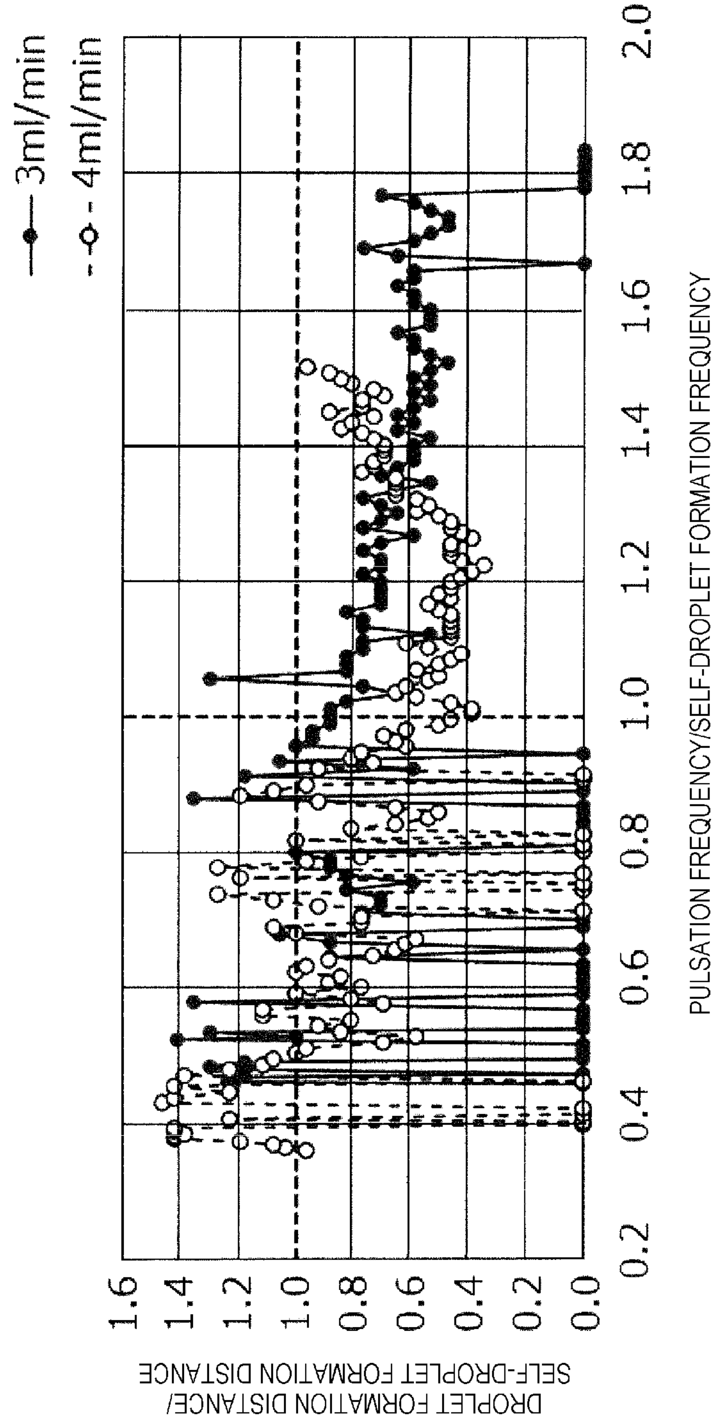
FIG. 9 is a graph normalized by using self-droplet formation frequencies and self-droplet formation distances in a case in which the droplet formation is performed at an amplitude of the peak-to-peak of 20 V at a flow rate of 3 ml/min and in a case in which the droplet formation is performed at the amplitude of the peak-to-peak of 20 V at a flow rate of 4 ml/min.

FIG. 9 is a graph normalized by using the self-droplet formation frequencies and the self-droplet formation distances in a case in which the droplet formation is performed at an amplitude of the peak-to-peak of 20 V at a flow rate of 3 ml/min and in a case in which the droplet formation is performed at the amplitude of the peak-to-peak of 20 V at the flow rate of 4 ml/min. Here, the term “normalized” represents a preferable range of the vibration frequency obtained by the vibrator 40, that is, the pulsation frequency, and specifically means a region of the pulsation frequency/self-droplet formation frequency in which the droplet formation distance/self-droplet formation distance in FIG. 9 is not 0 and is 1.0 or less. At the flow rate of 3 ml/min, the self-droplet formation frequency is 180 kHz, and the self-droplet formation distance is 17 mm. On the other hand, at the flow rate of 4 ml/min, based on the above results, the self-droplet formation frequency is 247 kHz, and the self-droplet formation distance is 26 mm.

As shown in FIG. 9, it can be seen that even when the self-droplet formation frequency changes, the frequency of the flow pulsation is stabilized by setting the frequency of the flow pulsation to a range exceeding the self-droplet formation frequency, that is, a range in which the pulsation frequency/self-droplet formation frequency exceeds 1. A region in which the frequency of the flow pulsation is stable in FIG. 9 is a region in which the droplet formation distance/self-droplet formation distance does not become 0 but becomes 1.0 or less. Further, as described above, the upper limit of the frequency (the vibration frequency generated by the vibrator 40) is preferably 1.5 times or less, and more preferably 1.3 times or less the self-droplet formation frequency.

Here, the vibrator 40 according to the embodiment shown in FIG. 2 can generate the vibration that causes the liquid 3 to pulsate in the direction a which is a transport direction of the liquid 3. By causing the liquid 3 to pulsate in the transport direction of the liquid 3, the droplet formation distance can be particularly suitably shortened.

Specifically, the vibrator 40 causes the single plate piezoelectric element 42 to vibrate the liquid transport pipe 7 in a direction orthogonal to the direction a, which is the transport direction of the liquid 3. With such a configuration of the vibrator 40, it is possible to easily form a configuration in which the liquid transport pipe 7 is caused to vibrate in the transport direction of the liquid 3.

However, the configuration is not limited to this. For example, the vibrator 40 may be configured to cause the liquid transport pipe 7 to vibrate in the transport direction of the liquid 3 by changing a shape of the liquid transport pipe 7 and an arrangement of the single plate piezoelectric element 42 with respect to the liquid transport pipe 7. By causing the liquid transport pipe 7 to vibrate in the transport direction of the liquid 3, the liquid 3 can be suitably caused to pulsate in the transport direction of the liquid 3, similarly to the vibrator 40 according to the embodiment.

The present disclosure is not limited to the embodiment described above, and can be implemented in various configurations without departing from the scope of the disclosure. In order to solve a part or all of problems described above, or to achieve a part or all of effects described above, technical characteristics in the embodiment corresponding to the technical characteristics in each embodiment described in the summary of the disclosure can be replaced or combined as appropriate. The technical features can be deleted as appropriate unless the technical features are described as essential in the present description.

What is claimed is:

1. A liquid ejection device comprising:

a nozzle through which a liquid is ejected in a continuous state;

a liquid transport pipe that transports the liquid to the nozzle; and a vibrator that is configured to generate a vibration, wherein the vibrator includes a fluid chamber, a diaphragm and a piezoelectric element, the nozzle is positioned downstream of the fluid chamber, the diaphragm is disposed, in an ejection direction of fluid ejected from the nozzle, across the fluid chamber from the nozzle, the piezoelectric element is fixed to a surface of the diaphragm, the surface being opposite from the fluid chamber, the liquid transport pipe is connected to the fluid chamber, a vibration frequency generated by the vibrator is higher than a self-droplet formation frequency, the self-droplet formation frequency is defined as a number of droplets of the liquid passing through a predetermined position per unit time in a state in which the vibrator does not generate the vibration, and the liquid in the continuous state ejected from the nozzle is divided by surface tension of the liquid and flies as the droplets.

2. The liquid ejection device according to claim 1, wherein the vibration frequency generated by the vibrator is 1.5 times or less the self-droplet formation frequency.

3. The liquid ejection device according to claim 1, wherein the vibration frequency generated by the vibrator is 90 kHz or more.

4. The liquid ejection device according to claim 2, wherein the vibration frequency generated by the vibrator is 90 kHz or more.

5. The liquid ejection device according to claim 1, wherein the generated vibration causes the liquid to pulsate in a transport direction of the liquid.

6. The liquid ejection device according to claim 2, wherein the generated vibration causes the liquid to pulsate in a transport direction of the liquid.

7. The liquid ejection device according to claim 3, wherein the generated vibration causes the liquid to pulsate in a transport direction of the liquid.

8. The liquid ejection device according to claim 4, wherein the generated vibration causes the liquid to pulsate in a transport direction of the liquid.

9. The liquid ejection device according to claim 5, wherein the vibrator causes the liquid transport pipe to vibrate in the transport direction of the liquid.

10. The liquid ejection device according to claim 8, wherein the vibrator causes the liquid transport pipe to vibrate in the transport direction of the liquid.

11. The liquid ejection device according to claim 5, wherein the vibrator causes the liquid transport pipe to vibrate in a direction orthogonal to the transport direction of the liquid.

12. The liquid ejection device according to claim 8, wherein the vibrator causes the liquid transport pipe to vibrate in a direction orthogonal to the transport direction of the liquid.

* * * * *